UNITED STATES PATENT OFFICE.

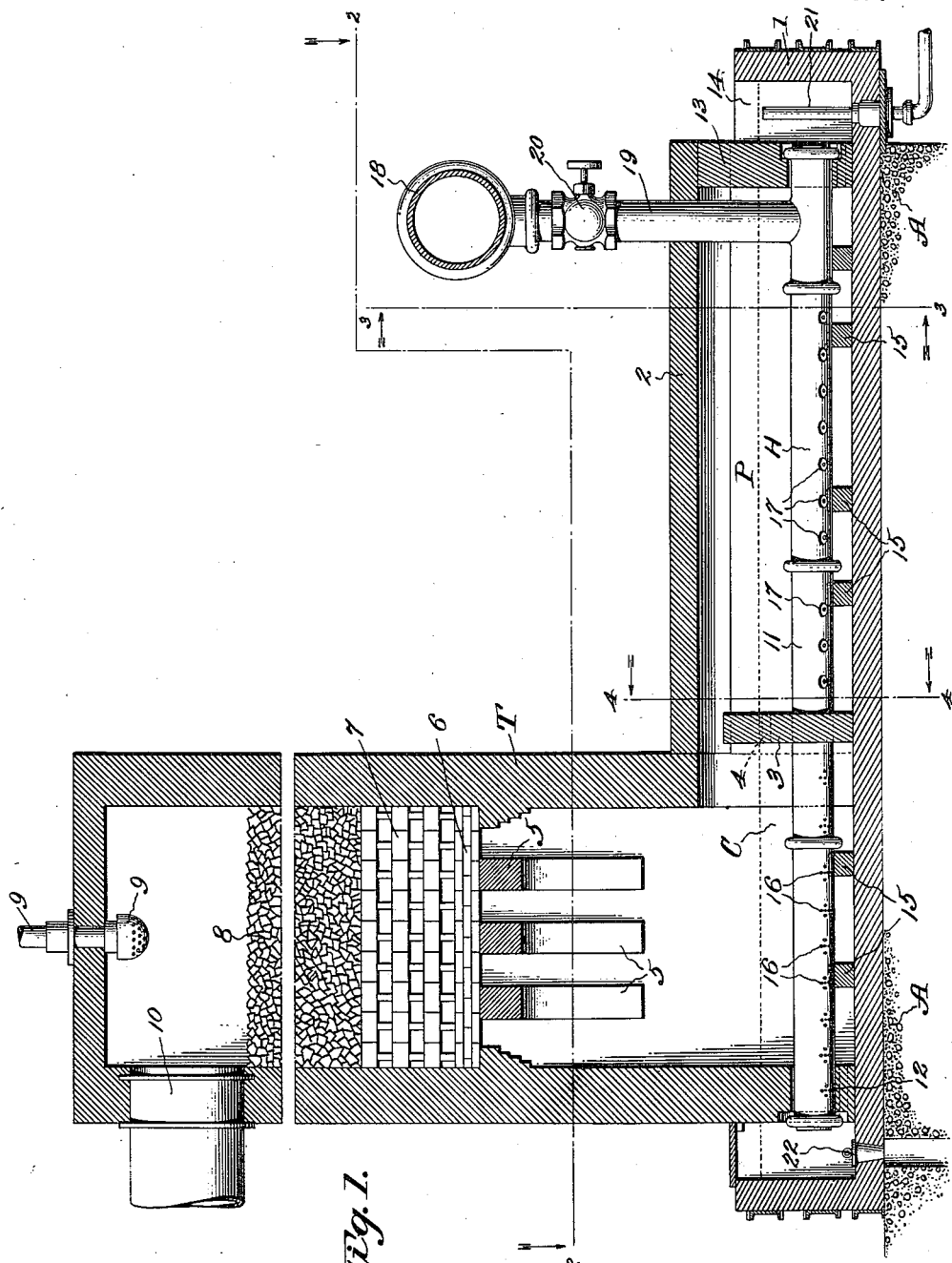

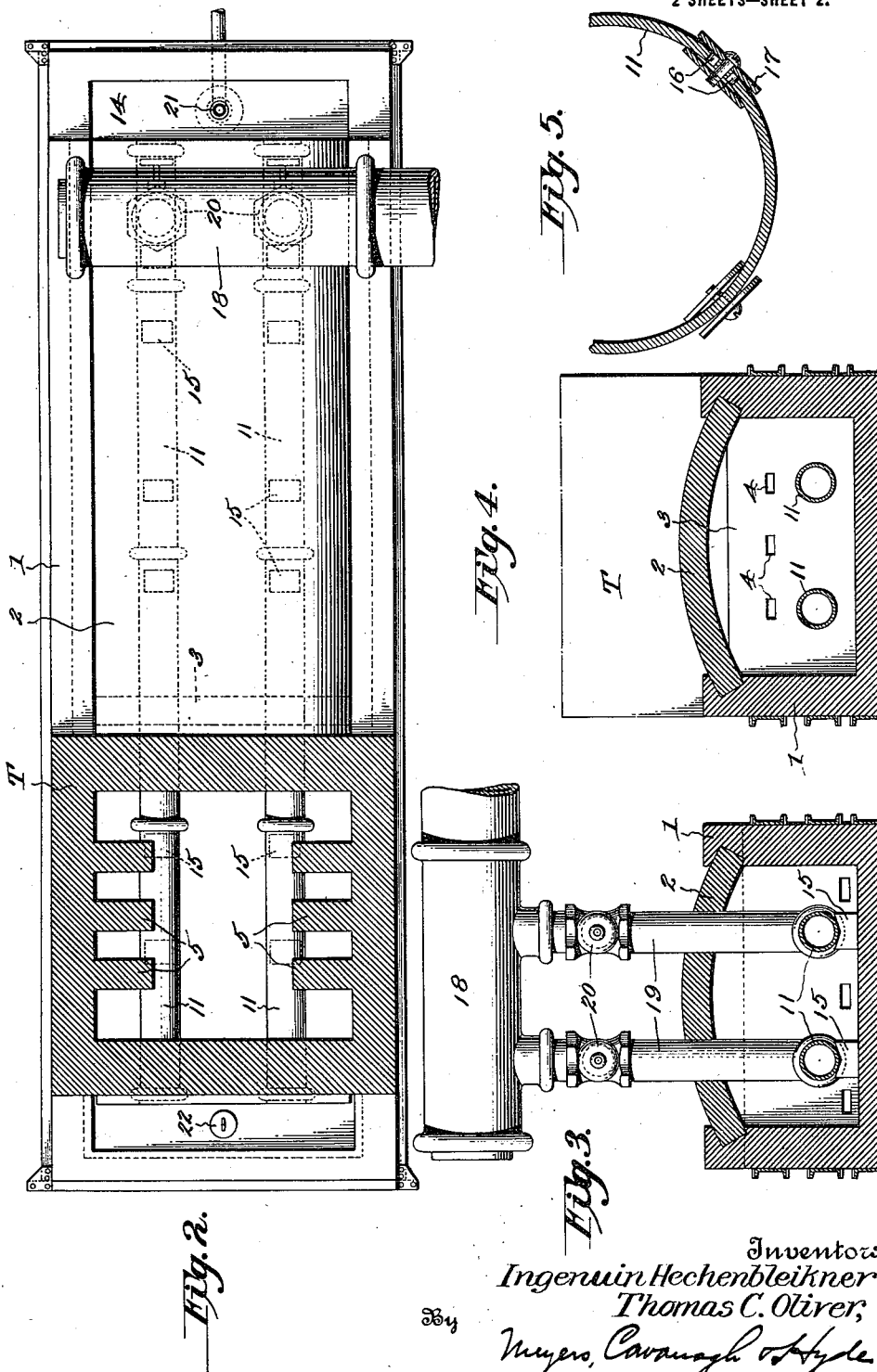

INGENUIN HECHENBLEIKNER AND THOMAS C. OLIVER, OF CHARLOTTE, NORTH CAROLINA, ASSIGNORS TO CHEMICAL CONSTRUCTION COMPANY, A CORPORATION OF NORTH CAROLINA.

METHOD OF AND APPARATUS FOR CONCENTRATING ACID.

1,415,443.  Specification of Letters Patent.  Patented May 9, 1922.

Application filed September 16, 1920. Serial No. 410,626.

*To all whom it may concern:*

Be it known that we, INGENUIN HECHENBLEIKNER and THOMAS C. OLIVER, citizens of the United States, and residents of the city of Charlotte, in the county of Mecklenburg and State of North Carolina, have invented certain new and useful Improvements in Methods of and Apparatus for Concentrating Acid, of which the following is a specification.

This invention relates to a method of and apparatus for treating acid.

In the present instance we have shown and described our invention as employed for the concentration, recovery and restoration of the sludge acid resulting from the treatment of petroleum oils with sulphuric acid in well known refining processes, but we wish it to be understood that our invention is not limited in its useful purpose to the treatment of sludge acid as it will be found adapted for the concentration and purification of other liquids and acids with obvious variations and changes to suit the particular conditions encountered.

As is well known, crude petroleum oil or its fractional distillates is refined by subjecting the same to the action of sulphuric acid so that the latter will absorb the heavy hydrocarbons and other undesirable elements present in the crude oil. In practice, the sulphuric acid so used has an initial strength of about 66 degrees Baumé or stronger, but at the completion of the operation, and after the refined oil has been separated, there remains a sludge or waste or spent acid, which not only contains the impurities removed from the oil, but is also of a reduced strength, usually about 50 degrees Baumé, due to the fact the acid has absorbed a certain amount of water during the refining process. This sludge acid is generally then subjected to further dilution with steam and water in the operation of recovering such oil as may remain therein, and for the purpose of relieving the acid, as much as possible, of its absorbed impurities. This secondary treatment results in further diluting the acid and reducing it to a strength of usually about 30 degrees Baumé, and there also remains in the body of acid a considerable amount of hydrocarbon containing volatile impurities. Therefore, in order to reclaim or recover the sulphuric acid from the sludge and render it fit for further use in the refining of oil, it is not only necessary to concentrate the acid for the purpose of eliminating water and thereby raising or restoring the acid to its efficient working strength of about 66 degrees Baumé, but it is further required that the undesirable hydrocarbons remaining in the acid be broken up, and the volatile impurities thereof be driven off, so that with the removal of such volatile impurities foreign matter remaining in the acid will be principally in the nature of inert carbon which is incapable of effecting or reducing the efficiency of the reclaimed sulphuric acid when the latter is subsequently again used in the refining of oil.

Heretofore the conventional and generally practiced method of recovering, reclaiming and concentrating sludge acid has been to run the sludge into a suitable still or container and subject the same to external heat until the desired temperature and strength has been reached. This common method is admittedly inefficient because of the large heat losses, and is expensive as the stills or containers are rapidly destroyed in operation, and require frequent replacement or renewal.

Recently it has been proposed to reclaim and concentrate the sludge acid by the application of internal heat, this being accomplished by passing hot air or hot gases directly through the acid.

In using this internal heat treatment for the reclaiming and concentration of sludge acid we have found certain defects incident thereto, the principal difficulty appearing to be that the acid is not subjected to sufficient heat because of the fact that the violent agitation set up by the air or gases passing through the acid causes a cooling of the latter and prevents the temperature of the acid reaching a point above from 400 to 450 degrees F. This comparatively low temperature is insufficient to break up the objectionable hydrocarbons and to eliminate the volatile impurities thereof, so that undesirable components are still present when the acid has been concentrated to its desired strength. We have discovered however that if the body of sludge acid can be internally heated to a temperature of from 540 to 560 degrees F., for a substantial period of time, say from one to six hours, the volatile impurities will be driven off and the undesirable hydrocarbons either eliminated entirely or reduced to substantially inert carbon which is incapable of affecting the efficiency of the acid when again used for oil refining purposes.

In the practice of our invention we proceed according to such a method and through the instrumentality of such an apparatus that not only is the diluted, weak, spent acid concentrated and restored to its desired strength of say 66 degrees Baumé, but the deleterious impurities hereinbefore mentioned are eliminated or rendered ineffective. All this we accomplish with far greater rapidity, economy, efficiency and convenience then is possible by previously known methods and equipment.

Before entering into a detailed description of our invention we will briefly state that the preferred form of apparatus which we use embraces a trough-like flue adapted to receive the diluted or spent sludge acid, such acid flue preferably communicating with a packed absorption tower of suitable construction and down through which the sludge acid flows or passes on its way into the flue, and countercurrent to hot gases from such flue passing up through the tower, as hereinafter described. For a clear understanding of the invention the acid flue may be considered as divided into two sections— an acid concentrating section communicating with the tower and an acid purifying section forming an extension of the concentrating section. The acid coming down the tower passes first into the concentrating section of the flue, where it is agitated and concentrated at a relatively low temperature and thence flows to the purifying section of the flue where the undesirable impurities are eliminated while the acid is in a non-agitated or static condition by the application of heat at a relatively high temperature. For the purpose of both concentration and purification we resort to the use of a heater which is submerged in the acid within both sections of the flue, and through which heater a suitable heating agent such as hot air or hot gas is passed under pressure. The heating agent is admitted, preferably at a temperature of from 1150 to 1350 degrees F., to that portion of the heater which is located within the purifying section of the flue, and conditions are so regulated that in its passage such air or gas will heat the concentrated static body of acid to a temperature of 550 degrees F., or thereabouts, or sufficient to break up the undesirable hydrocarbons and to drive off the volatile impurities. The heater in this section of the flue acts as a heat exchanger and the air or gas naturally loses a portion of its heat units, so that after heating the static acid it passes into the portion of the heater located within the concentrating section of the flue at a somewhat lower temperature than at its point of entry to the heater. The portion of the heater within the concentrating section of the flue is provided with suitable passages through which the air or gas issues, under pressure, in the form of jets or streams, and passing into and through the adjacent body of acid causes an agitation of the latter. This agitation results in all portions of the acid being presented for direct contact with the hot gases and consequently the water will be rapidly eliminated and concentration quickly effected. Furthermore, it will result in concentration being accomplished at a lower temperature than were the acid subjected to the hot gas while in a static condition, for experience has shown that while the static body of acid will require to be raised to a temperature of over 500 degrees F., for proper concentration,—in an agitated condition the concentration will proceed at a temperature of approximately 400 degrees F. The heated gases after passing through the body of acid enter the tower in an up-flowing stream, thus meeting the down-flowing stream of weak acid, and as the gases still retain a slight portion of their heat the down-coming acid will be preheated, thus adding to the efficiency of the concentrating operation. In practicing our invention it is not our intention to boil the acid in the purifying section of the flue in a pronounced manner, but to heat the acid sufficiently to cause it to simmer or stew at or slightly below its boiling point.

Our invention consists in the method of treating acids, and in the apparatus set forth in and falling within the scope of the appended claims.

In the accompanying drawings:

Figure 1 is a view partly in side elevation and partly in section of a preferred form of apparatus embodying our invention, Figure 2 is a view partly in plan and partly in horizontal section, Figure 3 is a cross sectional view taken on the line 3—3 of Figure 1, Figure 4 is a similar view taken on the line 4—4 of Figure 1.

Referring now to the accompanying drawings in detail the letter A indicates the foundation, which may be of any suitable character, and is preferably constructed of concrete or similar material and may be reinforced if deemed desirable. Supported upon this foundation is the trough-like acid flue 1, having the arched roof 2. This flue is constructed of any suitable acid-proof material such as acid-resisting silicate bricks laid in acid-proof mortar. The flue is divided into two sections or compartments by the transverse partition or baffle wall 3 which extends entirely across the flue but is provided adjacent its top portion with a series of ports or openings 4 through which the acid or other liquid may pass from the compartment C, which is the concentrating section of the flue, to the compartment P, which is the purifying section of such flue, these openings or ports being preferably located a slight distance below the normal liquid level. The concentrating section of the flue communicates with the bottom portion of the absorption tower T. This tower may be of any well known construction and in the present instance is provided at its lower portion with spaced arches 5, of acid-proof brick set in acid-proof cement, and designed to support a bridge 6, composed of parallel rows of bricks, the bridge in turn sustaining the brick checker work 7, above which is arranged the usual quarts for filling shown at 8. Such packing may be used as will suit the particular oil undergoing treatment, and in some instances the packing may be omitted entirely. At its upper top the tower is provided with the usual acid-spraying inlet pipe indicated at 9, and an outlet pipe 10, for the escape of spent gases. As is usual, the weak, spent acid to be concentrated and purified is introduced into the top of the tower through the acid inlet pipe 9 and trickling down over and through the packing and the checker work, passes first into the concentrating section C, of the acid flue, and when the proper level has been reached flows through the ports 4 in the flue partition, and into the purifying section of such flue.

In order to internally heat the acid for the purpose of concentration and purification we employ a suitable heater, and in the present instance such heater which is indicated as an entirety by the letter H, comprises a pair of parallel, horizontally disposed pipes 11, also of acid-resisting material, extending substantially the length of the acid flue, the inner ends of these heater pipes being supported in oie of the walls of the tower as at 12, while the outer ends of said heater pipes are supported in the wall 13, at the discharge end or pan of the acid flue 14. Mounted on the floor of the acid flue at suitable spaced intervals are acid-resisting blocks 15 which act to support the heater pipes.

It will be noted that the heater pipes extend throughout both concentrating and purifying sections of the acid flue, and such pipes are provided substantially throughout their length with spaced perforations or openings 16 forming ports for the escape of the hot air or hot gas under pressure. However, the ports formed in the portions of the heater pipes lying within the purifying section of the acid flue are normally closed by means of suitable and removable caps or seals 17, so that as the heating medium, such as the hot air or gas passes through those portions of the pipes lying within the purifying section of the flue, it will not escape into the acid, but will merely serve to heat the latter, while when such heating medium reaches the perforated portions of the pipes lying within the concentrating section of the flue it will escape under pressure through the openings or ports and be projected into the acid in such flue section, thereby agitating and concentrating such acid. The hot air or gas may be supplied to the pipes 11 through any suitable arrangement of flues or conduits. In the present instance we show a main heat conduit 18, connected with a suitable source of heat supply, such as a furnace (not shown), this conduit 18 extending transversely above the apparatus and being connected with the outer end portion of each heater pipe 11, by means of a vertical branch pipe 19, these branch pipes extending down through the roof of the acid flue. A suitable valve, conventionally illustrated at 20, is provided for each branch pipe 19, in order to turn on o. cut off the supply of heating medium from each of the horizontal heater pipes, as will be readily understood. The discharge pan 14 of the acid flue is provided with a suitably arranged draw-off or discharge pipe 21, through which the strong or concentrated and purified acid may be withdrawn from the flue, while the opposite end of the acid flue, or that end adjacent the tower is provided with a suitably packed drain pipe 22 for the purpose of draining or cleaning out the apparatus at this end.

In the practice of our method, and in the use of our apparatus, the weak sludge acid containing the undesirable impurities as heretofore mentioned is admitted to the tower through the distributor 9, and passing down through the tower flows into the concentrating section of the flue. The heating medium having been admitted, under pressure, to the horizontal heater pipes 11, flows through the latter toward the tower and is discharged through the open ports 15 into the concentrating section of the flue in the form of jets or streams, and passing up through the acid, agitates the latter, tossing the body of acid so that all parts of the latter will be presented to heat action and consequently the water will be rapidly driven off with the resulting concentration of the acid and without material loss of the latter. When the level of the acid in the concentrating section of the flue reaches the ports 4 in the partition or baffle wall, it flows into the purifying section of the flue. Here, not being subjected to agitation by the air or gas it will assume a substantially static condition, and will be subjected to heat from the gases flowing through the heater pipe portions lying within this section of the acid flue. As hereinbefore mentioned the heating medium such as the hot air or gas is admitted to the heater pipes at a relatively high temperature, say from 1150 to 1350 degrees F., and this high degree of heat will rapidly raise the temperature of the now concentrated acid in the purifying section of the flue to a temperature sufficient to break up the undesirable hydrocarbons and to drive off the volatile impurities of the latter, this usually taking place at a temperature of from 540 to 560 degrees F., or thereabouts. The hot air or gas after traversing the portions of the heater pipes within the purifying section of the flue of course then passes through to the concentrating section of the flue and agitates the acid therein as hereinbefore described, the acid being heated and concentrated at from 400 to 450 degrees F., the gases after leaving the acid in the concentrating section of the flue then passing up through the tower in contact with and countercurrent to the down-coming acid, so that the latter after passing into the acid flue is in a heated condition and susceptible of ready concentration. After the acid has been thoroughly concentrated and purified, it is withdrawn from the flue at the discharge or draw-off pipe 21.

While we have herein shown and described the preferred form of our apparatus, we wish it to be understood that we do not confine ourselves to all the precise details set forth herein by way of illustration, as modification and variation may be made without departing from the spirit of the invention or exceeding the scope of the appended claims. For example it will be readily understood that we may employ any number of heater pipes in the acid flue, and that the heating medium may be conducted to these pipes through any suitable arrangement of connections to meet the particular condition or location of the plant. Furthermore, the baffle or partition wall may be arranged at any desired point within the flue so as to provide any portions or sections of the desired size. By providing the ports in the portions of the heater pipes lying within the purifying section of the flue, with closures in the nature of removable caps or seals, we make provision for opening and closing one or more of the ports as may be deemed necessary or desirable to regulate the portions of the pipes which can be used as heat exchangers and the portions which shall be used for agitation and concentrating purposes.

Furthermore, in some instances it may be desirable to subject the acid in the purifying section of the flue to concentrating action, this taking place simultaneously with concentration in the concentrating section of the flue. For example in the concentrating section of the flue the acid may be raised to about 62–64 degrees Baumé and then permitted to flow into the purifying section of the flue where simultaneously with the purification it is subjected to heat to concentrate to a strength of substantially 66 degrees Baumé. Thus the acid may be concentrated by the same heating elements while in both an agitated and a static condition.

What we claim is:

1. The herein described method of concentrating and purifying sludge acids or separated sludge acids which consists in first concentrating the sludge acid by subjecting a body of the acid to heat at one stage and then purifying the concentrated acid by subjecting the same to a higher degree of heat at another stage to eliminate or neutralize impurities.

2. The herein described method of concentrating and purifying sludge acids or separated sludge acids which consists in concentrating the sludge acid at one stage by subjecting a body of the same to heat and agitation and of purifying the concentrated acid by subjecting the same to heat at a second stage to eliminate or neutralize impurities.

3. The herein described method of treating sludge acids or separated sludge acids which comprises subjecting the acid to a sufficient degree of heat to concentrate the same while said acid is in a state of agitation, and then subjecting said concentrated acid to a higher degree of heat while in a substantially static condition to eliminate or neutralize undesirable impurities.

4. The herein described method of treating sludge acids or separated sludge acids which comprises passing hot air or gas through said acid to agitate and concentrate the latter, and subsequently internally heating the concentrated acid while in a static condition sufficiently to eliminate or neutralize undesirable impurities.

5. The herein described method of concentrating and purifying sludge acids which consists in first passing the weak acid in countercurrent to heated air or gas to preheat the same, in then concentrating the acid by passing hot air or hot gas through the acid and agitating the same and subsequently purifying the acid by heating the same to raise the acid to sufficient temperature to eliminate or neutralize undesirable impurities.

6. The herein described method of concentrating and purifying sludge acid which comprises passing weak acid in countercurrent to heated air or gas to preheat the same, in then agitating and simultaneously heating the sludge acid at a sufficient temperature to concentrate the latter, and subjecting the acid to a relatively higher degree of heat than used for the concentration to eliminate or neutralize undesirable impurities.

7. The herein described method of treating acid which comprises subjecting the acid while in an agitated condition, to heat, sufficient to raise the acid to a temperature of at least 400 degrees F., to concentrate such acid, and subjecting said acid while in a static condition to heat sufficient to raise the temperature of the acid to at least 540 degrees F., to eliminate or neutralize undesirable impurities.

8. The herein described method of treating sludge acid or separated sludge acid which comprises passing hot air or hot gas through the body of acid to concentrate the same, and internally heating the body of concentrated acid with hot air or hot gas as the heating medium to eliminate or neutralize undesirable impurities.

9. The herein described method of treating acid which comprises internally heating the acid at one stage, by conducting hot air or hot gas under pressure through a conduit passing through the acid, and subjecting said acid to heat and agitation at another stage, by passing the hot air or hot gas through the acid at the last mentioned stage.

10. The herein described method of concentrating and purifying sludge acid which comprises passing hot air or hot gas through a body of the sludge acid at a relatively low temperature, and subsequently subjecting the acid to the heating action of hot air or gas at a relatively high temperature.

11. The herein described method of concentrating and purifying acid which comprises passing weak acid in countercurrent against heated air or gas to preheat the acid, then subjecting said preheated acid to the hot air or gas to agitate and concentrate the acid, then permitting said acid to assume a substantially static condition, and then heating the static body of acid sufficiently to eliminate or neutralize undesirable impurities therein.

12. As a step in the art of treating sludge acid, containing hydrocarbon impurities, the process of internally heating the acid to bring the latter to a temperature of at least 540 degrees F., for the purpose of driving off the volatile impurities and subsequently reducing the hydrocarbon impurities to inert carbon whereby a purified body of acid is obtained.

13. As a step in the art of concentrating and purifying acid, the process which comprises concentrating the acid and allowing it to assume a static condition, and then purifying the acid by conducting highly heated gas or air through the static body of acid to eliminate or neutralize impurities therein.

14. In an apparatus for treating acid, acid compartments comprising an acid concentrating section, and an acid purifying section in communication therewith whereby acid may pass from the concentrating section to the purifying section, means for internally heating the acid in the acid purifying section without agitation, and means for passing a heating and agitating medium through the acid in the concentrating section.

15. In an apparatus for treating acid, a compartment for concentrating acid, a compartment for purifying the acid, and a heating device adapted to conduct a heating medium through the acid in the purifying compartment without agitation and to pass said heating medium under pressure through the acid in the concentrating compartment.

16. The herein described method of concentrating and purifying sludge acids which consists in first concentrating the sludge acid by subjecting the same to heat and agitation at one stage and then purifying the same by subjecting the concentrated sludge acid to a higher degree of heat without agitation at a second stage to eliminate and neutralize impurities.

17. The herein described method of treating sludge acids or separated sludge acids which consists in subjecting the said sludge acid to heat and agitation at one stage and thereafter subjecting the acid to heat to neutralize or eliminate impurities while the same is in a substantially static condition.

18. The herein described method of treating sludge acids or separated sludge acids which consists in subjecting the sludge acid to heat and agitation at one stage and thereafter subjecting the said acid to a continued treatment of heat at a higher temperature to neutralize or eliminate impurities while the said acid is in a substantially quiescent state.

19. The herein described method of treating sludge acids or separated sludge acids which consists in internally heating the acid at one stage by conducting hot air or hot gas under pressure through the acid without agitating the same and in subjecting the acid to heat and agitation at another stage by passing the hot air or hot gas through the acid at the last mentioned stage.

20. The herein described method of treating sludge acids or separated sludge acids which consists in conducting hot air or hot gas under pressure through the sludge acid at one stage without agitating the same and in passing the hot air or hot gas at a lower temperature through the acid at a second stage to heat and agitate the same.

Signed by INGENUIN HECHENBLEIKNER, at Charlotte, in the county of Mecklenburg, and State of North Carolina, this 10th day of September A. D. 1920.

INGENUIN HECHENBLEIKNER.

Signed by THOMAS C. OLIVER, at New York city, in the county of New York and State of New York this 13th day of September, A. D. 1920.

THOMAS C. OLIVER.